(12) United States Patent
Singh et al.

(10) Patent No.: US 12,512,981 B2
(45) Date of Patent: Dec. 30, 2025

(54) SECURE RANGING SECRET KEY COMPLIANCE FOR SHORT-RANGE COMMUNICATION DEVICES

(71) Applicant: Infineon Technologies AG, Neubiberg (DE)

(72) Inventors: Ajinder Pal Singh, Allen, TX (US); Franz-Josef Brücklmayr, Kaufering (DE); Stephen Hanna, Clermont, FL (US)

(73) Assignee: Infineon Technologies AG, Neubiberg (DE)

( * ) Notice: Subject to any disclaimer, the term of this patent is extended or adjusted under 35 U.S.C. 154(b) by 63 days.

(21) Appl. No.: 18/653,656

(22) Filed: May 2, 2024

(65) Prior Publication Data

US 2025/0343687 A1 Nov. 6, 2025

(51) Int. Cl.
*H04L 9/08* (2006.01)
(52) U.S. Cl.
CPC .................................. *H04L 9/088* (2013.01)
(58) Field of Classification Search
CPC ........................................................ H04L 9/088
See application file for complete search history.

(56) References Cited

U.S. PATENT DOCUMENTS

| | | | | |
|---|---|---|---|---|
| 9,392,443 | B2 * | 7/2016 | Roberts | H04W 12/02 |
| 10,621,352 | B2 * | 4/2020 | Nix | H04L 9/0838 |
| 11,671,530 | B2 * | 6/2023 | Ledvina | H04M 1/72436 |
| | | | | 455/418 |
| 11,757,874 | B2 * | 9/2023 | Bernsen | H04L 63/18 |
| | | | | 713/169 |
| 2023/0403142 | A1 * | 12/2023 | Ishiguro | H04L 9/085 |

* cited by examiner

*Primary Examiner* — Han Yang
(74) *Attorney, Agent, or Firm* — Banner & Witcoff, Ltd.

(57) ABSTRACT

A responder device, including: a wireless module operable for short-range communication; and processor circuitry coupled to the wireless module and operable to: generate a first query for an initiator device in a ranging area of the responder device to initiate a verification of whether an active secure-ranging secret key as stored within the initiator device complies with an active secure-ranging secret key as stored within the responder device; and receive a first query response including an indication of whether the active secure-ranging secret key as stored within the initiator device complies with the active secure-ranging secret key as stored within the responder device.

20 Claims, 4 Drawing Sheets

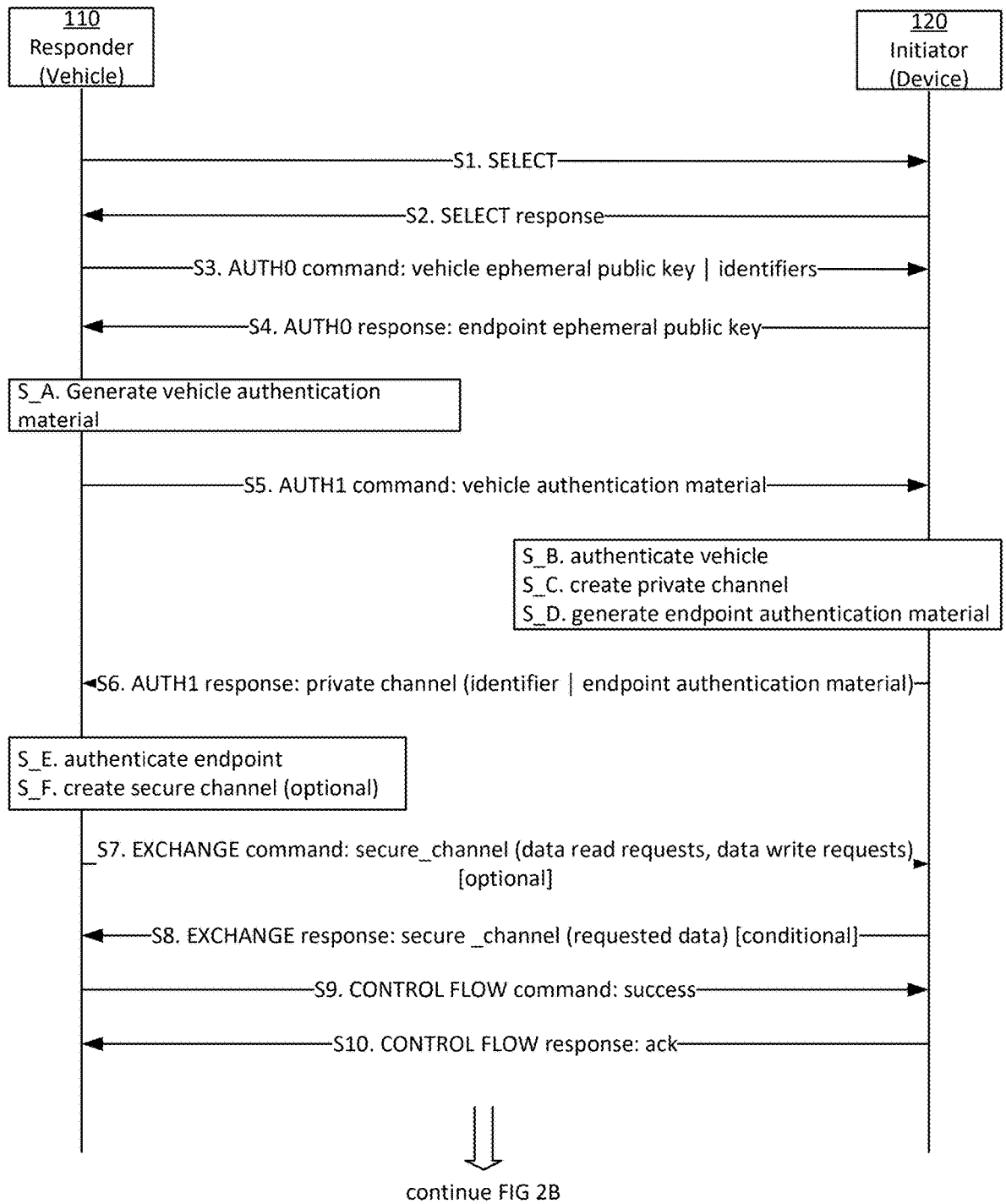

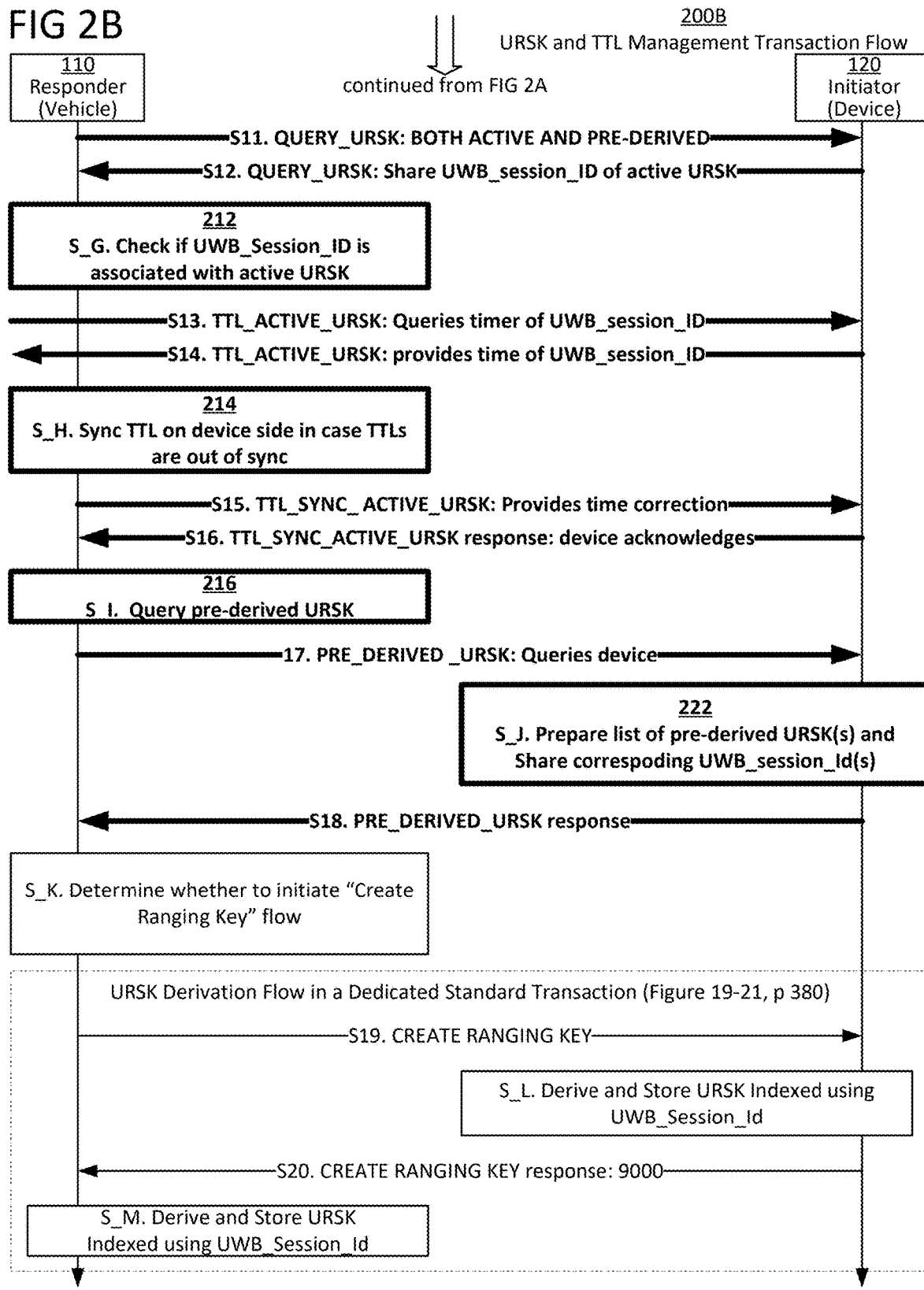

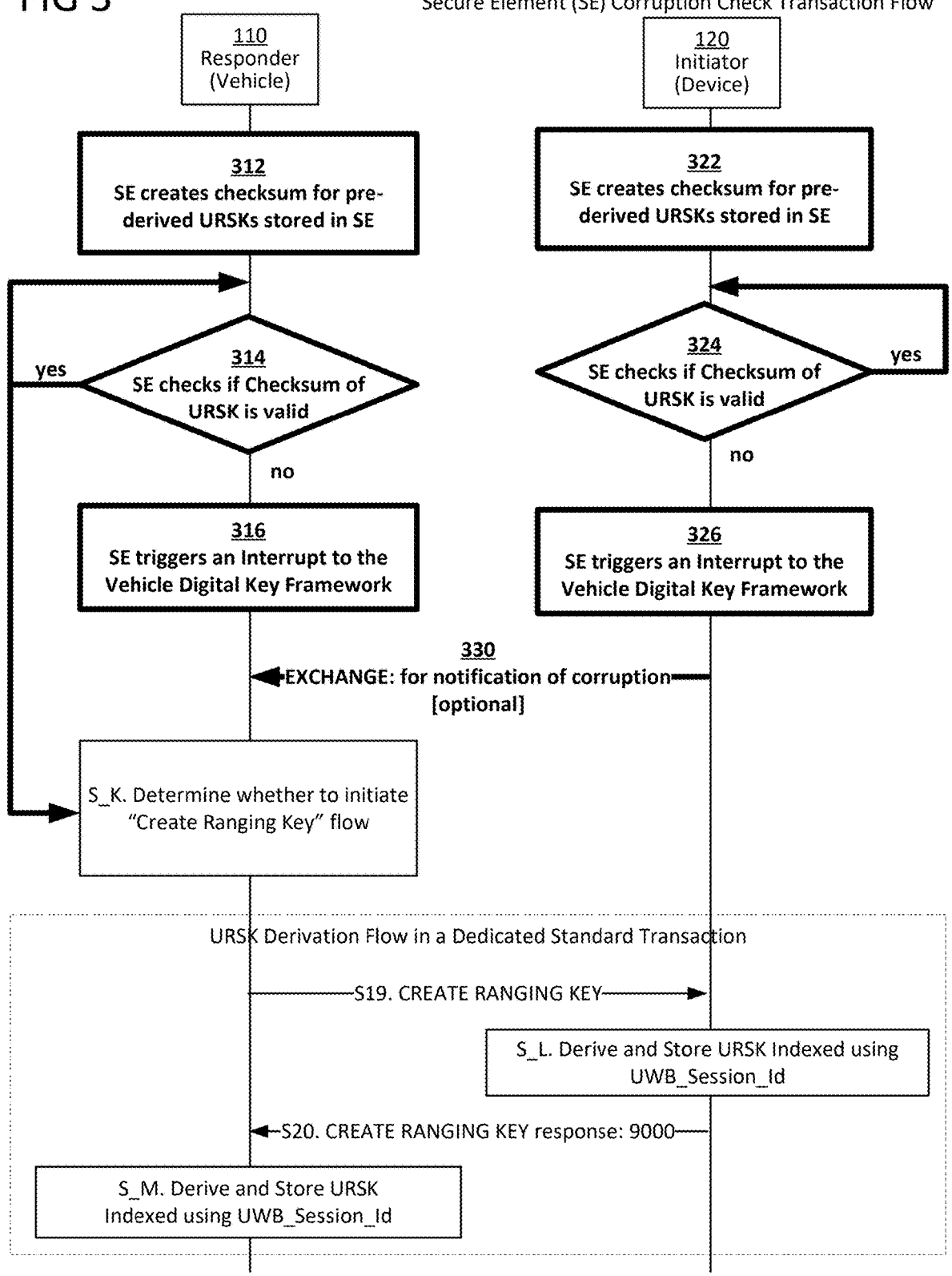

SECURE RANGING SECRET KEY COMPLIANCE FOR SHORT-RANGE COMMUNICATION DEVICES

TECHNICAL FIELD

The disclosure relates to secure ranging secret keys and, more particularly, compliance with secure ranging secret key applications.

BACKGROUND

The Car Connectivity Consortium (CCC) is an international association of vehicle manufacturers, suppliers, and technology companies that collaborate to develop standards for how vehicles communicate with other devices, such as smartphones. The CCC, Digital Key Release 3, Technical Specification (hereinafter the "CCC Specification") specifies a digital key ecosystem using a standardized digital key applet, standardized vehicle access protocol, and a scalable architecture to support wide-scale deployment of digital key services across different vehicle and device OEMs.

In secure ranging applications, such as using a digital key for vehicle access, a crucial element is the secure ranging secret key. This key is generated within a secure element (SE) embedded in both the accessing device and the vehicle. After establishing Bluetooth low energy (LE) encryption, if the vehicle is equipped with ultra-wideband (UWB) technology, the vehicle SE and the device SE together derive a unique secret ranging secret key (URSK). The URSK is not transmitted over the air, safeguarding its confidentiality.

However, the CCC Specification leaves several issues concerning secure ranging secret keys open to interpretation. These issues are relevant not only within the CCC Specification but, in some cases, also in secure ranging protocols defined by the FiRa (fine ranging) Consortium and the Anti-Corruption Working Group (ACWG). For instance, certain conditions not specified in the CCC Specification might necessitate the deletion and re-derivation of pre-existing URSKs stored in the accessing device's SE, a process referred to as a URSK refresh. The specification does not clarify the triggers for such a refresh or the circumstances that might lead to a URSK recovery failure.

BRIEF DESCRIPTION OF THE FIGURES

FIG. 2A illustrates a standard transaction flow between a responder device and an initiator device.

FIG. 2B illustrates a URSK and time-to-live (TTL) management transaction flow, in accordance with aspects of the disclosure.

FIG. 3 illustrates a secure element corruption check transaction flow, in accordance with aspects of the disclosure.

DETAILED DESCRIPTION

The present disclosure addresses issues concerning secure ranging secret keys open to interpretation by the CCC Specification.

1. System Overview

Figure 1:
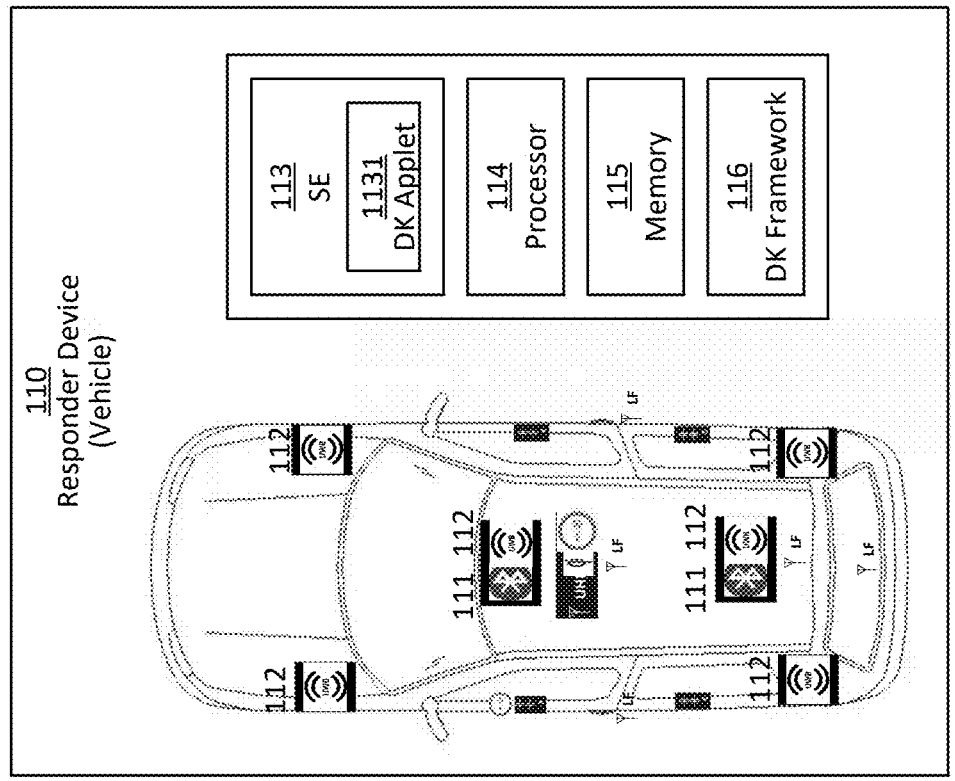
FIG. 1 illustrates a block diagram of a digital key communication system, in accordance with aspects of the disclosure.
Figure 1:
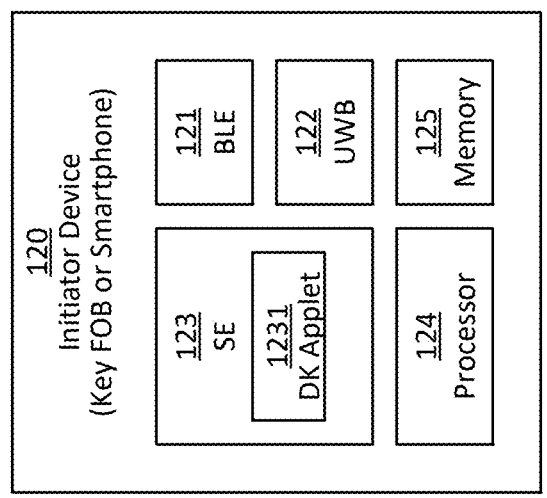

FIG. 1 illustrates a block diagram of a digital key communication system (system 100), in accordance with aspects of the disclosure.

System 100 comprises a responder device 110 and an initiator device 120. In the CCC Specification nomenclature, responder device 110 and initiator device 120 are referred to simply as "responder" and "initiator," respectively. Responder device 110 could be a vehicle or any secure object, such as a gate or house. Initiator device 120 utilizes a digital key to control or access responder device 110, where the digital key is conceptualized as a digitized, virtual key.

Responder device 110 comprises wireless modules 111, 112, a secure element (SE) 113, processor circuitry 114, memory 115, and a digital key (DK) framework 116.

The wireless modules 111, 112 handle the transmission and reception of short-range wireless signals 130 with initiator device 120. These include Bluetooth Low Energy (BLE) modules 111 for proximity detection, and Ultra-Wideband (UWB) modules 112 for UWB ranging sessions. Each module may be comprised of single or multiple integrated circuits, or part of a unified chip solution.

During a UWB ranging session, a secure UWB ranging secret key (URSK) is generated in SE 113 following a request from BLE module 111. This URSK, once generated, is securely communicated to UWB modules 112 but is not transmitted externally, thereby ensuring security. The URSK is not exchanged but utilized internally to derive additional encryption keys for securing communications between responder device 110 and initiator device 120. While the example provided focuses on URSK, the techniques discussed are applicable to any secure ranging secret key.

SE 113 serves as a secure and isolated storage device accessible only to authorized applications. It hosts a digital key applet 1131, which manages digital keys including storing and issuing URSKs. A URSK effectively operates for a session generated to perform ranging using UWB communications and might include identifiers for responder device 110, public keys, and other relevant data ensuring secure access.

Digital key framework 116 provides a software or hardware environment for providing a digital key management service. Digital key framework 116 manages and stores digital keys within SE 113.

Processor circuitry 114 within responder device 110 is responsible for managing the device's overall operations. Processor circuitry 114 is designed to control various operations of the responder device 110. It may comprise one or more of different types of processors like a machine control unit (MCU), a microcontroller, a central processing unit (CPU), a graphics processing unit (GPU), and orchestrates the operations of responder device 110. It controls other components of responder device 110 to execute tasks in accordance with the disclosed aspects. For example, it can execute programs, read files from, or write files to memory 115.

The memory 115 may include any type of storage medium among a flash memory, a hard disk-type memory, multimedia card micro-type memory, a card-type memory (e.g., a secure digital (SD) or extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, an optical disk, and the like.

Initiator device 120, which could be a smartphone, key FOB, or other mobile device, includes many of the same or similar components of responder devices 110 with corresponding wireless modules 121, 122, SE 123 (having digital key applet 1231), processor circuitry 124, and memory 125.

While this disclosure primarily addresses BLE and UWB technologies, the described techniques could be adapted for use with other short-range communication technologies such as WLAN (wireless local area network), WiFi (wireless fidelity), Bluetooth, Zigbee, infrared data association (IrDA), near-field communication (NFC), etc.

II. Standard Transaction Flow

FIG. 2A illustrates a standard transaction flow 200A between responder device 110 and initiator device 120, as prescribed by the CCC Specification. The transaction protocol aims to ensure mutual authentication, tracking resilience, integrity, and confidentiality of the transaction.

The transaction begins when responder device 110 issues a SELECT command to activate the digital key applet instance for the transaction (Step S1). In response, initiator device 120 sends a list of supported digital key applet protocol versions (Step S2).

Subsequently, a secure channel initiation occurs at Steps S3 and S4. Here, both responder device 110 and initiator device 120 generate ephemeral key pairs. Responder device 110 then transmits an AUTH0 command to initiate the authentication process and generates an ephemeral public key. This facilitates the derivation of a shared secret on both devices 110, 120, employing techniques such as Diffie-Hellman key exchange and a key derivation function to generate a shared symmetric key for secure communication.

The ephemeral public key from the responder device 110 is signed using its private key (Step S_A). This authenticates responder device 110 to initiator device 120 and ensures protection against privacy breaches from man-in-the-middle (MITM) attacks. It also secures the data transmitted by initiator device 120 against both passive and active eavesdropping.

Following this, responder device 110 sends an AUTH1 command at Step S5, allowing mutual authentication and establishment of a secure channel between responder device 110 and initiator device (Steps S_B and S_C).

Using the secure channel, initiator device 120 encrypts and sends its public key identifier, a signature over a data-derived challenge from responder device 110, and additional application-specific data (Step S_D). This transmission allows responder device 110 to authenticate initiator device 120 through verification of the transmitted signature (Steps S_E and S_F).

Optionally, responder device 110 sends issue an EXCHANGE command at Step S7 to read, write, or set data from confidential/private mailbox. Initiator device 120 responds with the requested data (Step S8). Commands and responses during this phase are securely encapsulated within the established secure channel.

The transaction concludes with a CONTROL FLOW command from responder device 110 at Step S9, which is used to indicate the transaction's success or failure or to communicate application-specific status codes. Initiator device 120 acknowledges this final status with a response (Step S10).

III. UWB Ranging Secret Key (URSK) and Time to Live (TTL) Management

According to the CCC Specification, responder device 110 can derive and store at least one pre-derived UWB ranging secret key (URSK) for each digital key, while initiator device 120 can derive and store two. Each derived URSK is indexed using its associated UWB session identifier.

Responder device 110 follows a secure ranging setup protocol to activate a pre-derived URSK. Per the CCC Specification, only one URSK can be active at any time per digital key. Activation of a new URSK results in the deactivation and discarding of the previously active URSK. Following the activation of a pre-derived URSK, responder device 110 initiates the derivation and storage of a new pre-derived URSK. This process is strategically timed to minimize disruption, such as after completing a passive entry, but ideally occurring soon after the previous URSK activation.

During a ranging session as specified by the CCC, responder device 110 sends a query to initiator device 120 with a UWB session identifier. If the URSK is not found or a failure occurs, responder device 110 will query again with a different UWB session identifier. The CCC Specification does not specify the conditions that might cause a URSK not to be found or what causes pre-derived URSK slots between responder device 110 and initiator device 120 to become out of sync. Additionally, if initiator device 120 cannot recover a requested ranging session, it sends a "ranging_session_recovery_failed" notification to responder device 110, which then discards the corresponding URSK. The CCC Specification lacks clarity on whether this relates to active or pre-derived URSK recovery, which may affect the synchronization of the TTL timers between the responder device 110 and the initiator device 120.

These gaps in the CCC Specification reveal several shortcomings. Neither initiator device 120 nor responder device 110 can proactively detect if pre-derived URSK slots are corrupted or take preemptive action to derive fresh URSKs. Additionally, responder device 110 does not proactively exchange information with initiator device 120 regarding the quantity of pre-derived URSKs or any active URSKs, nor is it informed about the remaining time on the TTL timer of any active URSKs.

This disclosure proposes improvements to address these deficiencies by ensuring that responder device 110 is immediately informed of the status of both active and pre-derived URSKs once initiator device 120 connects over Bluetooth low energy (BLE). This is achieved after responder device 110 issues the AUTH0 command (Step S3 in FIG. 2A) and receives a response from initiator device 120 (Step S4 in FIG. 2A). By confirming the status of the URSKs early in the connection, any issues with URSKs being out of sync or not found can be swiftly addressed, thereby enhancing the reliability of the Phone-as-a-Key (PaaK) functionality.

FIG. 2B illustrates a URSK and TTL management transaction flow 200B in accordance with aspects of the disclosure.

A. Active URSK Management

The URSK is generated within the SEs of both devices (SE 113 in responder device 110 and SE 123 in initiator device 120). Once the URSK is retrieved by the UWB module 112, 122 from SE 113, 123, it becomes active and starts its operational life.

To ensure compliance of URSKs between devices, responder device 110 initiates a verification process by sending a QUERY_URSK command to initiator device 120 when it is within the ranging area of responder device 110. This command asks initiator device 120 to confirm whether its active URSK complies with the one in responder device 110 (Step S11). Initiator device 120 responds by indicating whether there is a match (Step S12). Responder device 110 then verifies the response to confirm compliance of the URSKs between the two devices (Step 212 or S_G). This exchange ideally occurs shortly after the secure channel is established (Step S_F) and before initiator device 120 physically reaches responder device 110, at a time that minimally impacts ongoing operations. Furthermore, this verification process may be conducted periodically to maintain secure communication integrity.

B. Time to Live (TTL) Management

A URSK is discarded when its TTL time expires. The TTL for a URSK, set by the vehicle OEM, should not exceed 12 hours. The TTL timer, which is based on a secure time-stamping sequence (STS) for secure ranging, starts when the first derived URSK (dURSK) is derived.

The start of the TTL timer of the URSK between responder device 110 and initiator device 120 can occur at different times. In initiator device 120, the TTL timer starts when the URSK is derived in SE 123 and before it is transmitted to UWB modules 122. A derived URSK (dURSK) signal may indicate the initiation of this timer. However, in responder device 110, the first derived URSK may be derived in SE 113 and transmitted to UWB modules 112. The TTL timer begins not at the point of URSK derivation but rather when the URSK is transmitted to the UWB modules 112, without a dURSK signal to mark the event.

The CCC Specification does not provide for UWB modules 112 to signal the commencement of the TTL timer, when the URSK is derived, or provide for an exchange of active URSK TTL timers between initiator device 120 and responder device 110. This can lead to a potential lack of synchronization of TTL timers between initiator device 120 and responder device 110.

To rectify these synchronization issues, responder device 110 sends a TTL_ACTIVE_URSK query command to initiator device 120, requesting the TTL time of the active URSK stored in initiator device 120 (Step S13). Upon receiving the TTL information (Step S14), responder device 110 may adjust its timer to align with that of initiator device 120, ensuring both devices synchronize their URSK TTL timers (Step S_H; Step 214). This timer correction may occur each time, or alternatively, only if there is a discrepancy between the TTL timings of the two devices.

The timer correction process can be executed once or on a periodic basis. Typically, the TTL timer of responder device 110 takes precedence, meaning corrections are generally made to adjust the TTL of initiator device 120 to match that of responder device 110. Alternatively, adjustments may also be made to align the TTL of responder device 110 with that of initiator device 120, depending on specific circumstances.

These timer corrections are managed through a combination of the SEs 113, 123 and the processors overseeing these SEs 113, 123, enabling precise synchronization of the TTL timers across devices.

C. Pre-Derived URSK Management

Responder device 110 employs a secure ranging setup flow to activate a pre-derived URSK. Only one URSK may be active per digital key at any time, and it is discarded upon activation of another URSK. Subsequent to activating a pre-derived URSK, responder device 110 initiates the derivation and storage of another pre-derived URSK to ensure continuous secure operation, typically soon after the previous URSK activation, such as following a passive entry event, to minimize user impact.

Similarly, initiator device 120, also capable of secure ranging, supports the derivation and storage of two pre-derived URSKs per digital key, in accordance with the CCC Specification. These pre-derived URSKs are indexed and managed using their respective UWB session identifiers and are stored within the SE 123 of the initiator device.

The CCC Specification delineates a discrepancy in the number of pre-derived URSKs between the devices: two for initiator device 120 and at least one for responder device 110, which could lead to synchronization challenges regarding the number of available pre-derived URSKs.

To address this potential issue, responder device 110 generates and sends a PRE-DERIVED URSK QUERY command (Step 216 or S_I) to initiator device 120, requesting a list of pre-derived URSKs stored within initiator device 120 (Step S17). Initiator device 120 responds by providing this list along with their corresponding UWB session identifiers (Step 222 or S_J, and Step S18).

Depending on the results from this query, responder device 110 may determine it is necessary to initiate a ranging key creation flow (Step S_K) in accordance with the CCC Specification.

IV. Secure Element (SE) Corruption Check

FIG. 3 illustrates a SE corruption check transaction flow 300, verifying the integrity of stored URSKs within SEs, in accordance with aspects of the disclosure.

During the ranging key creation flow, SE 113 within responder device 110 computes an error detection/correction code (EDC/ECC) for each pre-derived URSK associated with a digital key (Step 312). It then verifies the integrity of the URSK by checking the validity of its EDC/ECC (Step 314). If the EDC/ECC is found to be invalid, suggesting corruption of the URSK, SE 113 triggers an interrupt to notify the digital key framework 116 (Step 316) and proceeds to generate a new pre-derived URSK. If the EDC/ECC is valid, SE 113 continues to monitor the integrity of the URSK and may repeat the integrity check process or resume other operations, including determining whether to initiate another ranging key creation flow (Step S_K).

Similarly, in initiator device 120, SE 123 performs a corresponding integrity check. SE 123 generates an EDC/ECC for each pre-derived URSK stored within it (Step 322) and assesses its validity (Step 324). If the EDC/ECC check indicates corruption (i.e., the EDC/ECC is invalid), SE 123 generates an interrupt for its digital key framework 116 (Step 326). Additionally, SE 123 may communicate this issue to responder device 110 through an optional EXCHANGE command (Step 330), facilitating coordinated error handling and response between the initiator device 120 and the responder device 110.

These measures ensure that any corruption in the SE's URSK storage is promptly detected by the digital key framework 116. Prompt detection enables proactive communication with digital key framework 116, which can initiate a query for the URSK, as in the process described above. This allows for the timely generation of a new URSK, thereby preventing any degradation in the user experience when using the Phone-as-a-Key (PaaK) functionality.

While the principles of this disclosure are illustrated using the CCC Specification, the concepts are intended to be applicable in broader contexts. The disclosed techniques may be adapted for use in other environments where similar technological applications are utilized.

The techniques of this disclosure may also be described in the following examples.

Example 1. A responder device, comprising: a wireless module operable for short-range communication; and processor circuitry coupled to the wireless module and operable to: generate a first query for an initiator device in a ranging area of the responder device to initiate a verification of whether an active secure-ranging secret key as stored within the initiator device complies with an active secure-ranging secret key as stored within the responder device; and receive a first query response including an indication of whether the active secure-ranging secret key as stored within the initiator device complies with the active secure-ranging secret key as stored within the responder device.

Example 2. The responder device of claim 1, wherein the processor circuitry is further operable to: verify whether a wireless session identifier corresponding with the active secure-ranging secret key as stored within the initiator device complies with the active secure-ranging secret key as stored within the responder device.

Example 3. The responder device of any one or more of claims 1-2, wherein the processor circuitry is further operable to: generate a second query for the initiator device to request a list of one or more pre-derived secure-ranging secret key(s) stored within the initiator device; and receive a second query response including the list of the one or more pre-derived secure-ranging secret key(s) stored within the initiator device, along with their corresponding wireless session identifier(s).

Example 4. The responder device of any one or more of claims 1-3, further comprising: a secure element operable to be managed by the processor circuitry and to: generate an error detection/correction code for a pre-derived secure-ranging secret key associated with a digital key and stored in the secure element; check if the error detection/correction code of the pre-derived secure-ranging secret key is valid; and generate an interrupt for a digital key framework if a result of the check is that the error detection/correction code of the pre-derived secure-ranging secret key is invalid indicating that the pre-derived secure-ranging secret key is corrupt.

Example 5. The responder device of any one or more of claims 1-4, wherein the secure element is further operable to: generate a new pre-derived secure-ranging secret key if the result of the check is that the error detection/correction code of the pre-derived secure-ranging secret key is invalid.

Example 6. The responder device of any one or more of claims 1-5, further comprising: a digital key framework wherein the processor circuitry is further operable to: receive from the initiator device an interrupt for the digital key framework when an error detection/correction code of a pre-derived secure-ranging secret key stored in a secure element of the initiator device is invalid indicating that this pre-derived secure-ranging secret key is corrupt.

Example 7. The responder device of any one or more of claims 1-6, wherein the processor circuitry is further operable to: generate a timer query for the initiator device regarding a Time To Live (TTL) time associated with the active secure-ranging secret key as stored in the initiator device; receive a timer query response including the TTL time; and generate a timer correction to synchronize the TTL time of the initiator device and a TTL time associated with the active secure-ranging secret key as stored in the responder device.

Example 8. The responder device of any one or more of claims 1-7, wherein the processor circuitry is further operable to: generate the timer correction if the TTL time of the initiator device and the TTL time of the responder device are out of synchronization.

Example 9. The responder device of any one or more of claims 1-8, wherein the processor circuitry is further operable to: generate the timer correction for the initiator device to synchronize the TTL time of the initiator device to the TTL time of the responder device.

Example 10. The responder device of cl any one or more of claims 1-9, wherein the processor circuitry is further operable to: generate the timer correction to synchronize the TTL time of the responder device to the TTL time of the initiator device.

Example 11. The responder device of any one or more of claims 1-10, wherein the responder device is comprised within a vehicle and the initiator device is comprised within a smartphone or key frequency operated button (key FOB).

Example 12. The responder device of any one or more of claims 1-11, wherein the generation of the first query and receipt of the first query response are performed within a predetermined period of time after the initiator device creates a secure wireless channel with the responder device.

Example 13. The responder device of any one or more of claims 1-12, wherein the generation of the first query and receipt of the first query response are performed periodically.

Example 14. The responder device of any one or more of claims 1-13, wherein the active secure-ranging secret key is an active ultrawide band (UWB) ranging secret key (URSK), and the wireless module is a UWB module.

Example 15. A method, performed by a responder device operable to engage in short-range wireless communications with an initiator device, the method comprising: generating a first query for the initiator device in a ranging area of the responder device to initiate a verification of whether an active secure-ranging secret key as stored within the initiator device complies with an active secure-ranging secret key as stored within the responder device; and receiving a first query response including an indication of whether the active secure-ranging secret key as stored within the initiator device complies with the active secure-ranging secret key as stored within the responder device.

Example 16. The method of claim 15, further comprising: verifying whether a wireless session identifier corresponding with the active secure-ranging secret key as stored within the initiator device complies with the active secure-ranging secret key as stored within the responder device.

Example 17. The method of any one or more of claims 15-16, further comprising: generating a second query for the initiator device to request a list of one or more pre-derived secure-ranging secret key(s) stored within the initiator device; and receiving a second query response including the list of the one or more pre-derived secure-ranging secret key(s) stored within the initiator device, along with their corresponding wireless session identifier(s).

Example 18. The method of any one or more of claims 15-17, further comprising: generating, by a secure element of the responder device, an error detection/correction code for a pre-derived secure-ranging secret key associated with a digital key and stored in the secure element; checking, by the secure element, if the error detection/correction code of the pre-derived secure-ranging secret key is valid; and generating, by the secure element, an interrupt for a digital key framework if a result of the check is that the error detection/correction code of the pre-derived secure-ranging secret key is invalid indicating that the pre-derived secure-ranging secret key is corrupt.

Example 19. The method of any one or more of claims 15-18, further comprising:

generating a timer query for the initiator device regarding a Time To Live (TTL) time associated with the active secure-ranging secret key as stored in the initiator device; receiving a timer query response including the TTL time; and generating a timer correction to synchronize the TTL time of the initiator device and a TTL time associated with the active secure-ranging secret key as stored in the responder device.

Example 20. The method of any one or more of claims 15-19, further comprising: generating the timer correction if the TTL time of the initiator device and the TTL time of the responder device are out of synchronization.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

The invention claimed is:

1. A responder device, comprising:
a wireless module operable for short-range communication; and
processor circuitry coupled to the wireless module and operable to:
  generate a first query for an initiator device in a ranging area of the responder device to initiate a verification of whether an active secure-ranging secret key as stored within the initiator device complies with an active secure-ranging secret key as stored within the responder device; and
  receive a first query response including an indication of whether the active secure-ranging secret key as stored within the initiator device complies with the active secure-ranging secret key as stored within the responder device.

2. The responder device of claim 1, wherein the processor circuitry is further operable to:
verify whether a wireless session identifier corresponding with the active secure-ranging secret key as stored within the initiator device complies with the active secure-ranging secret key as stored within the responder device.

3. The responder device of claim 1, wherein the processor circuitry is further operable to:
generate a second query for the initiator device to request a list of one or more pre-derived secure-ranging secret key(s) stored within the initiator device; and
receive a second query response including the list of the one or more pre-derived secure-ranging secret key(s) stored within the initiator device, along with their corresponding wireless session identifier(s).

4. The responder device of claim 1, further comprising:
a secure element operable to be managed by the processor circuitry and to:
  generate an error detection/correction code for a pre-derived secure-ranging secret key associated with a digital key and stored in the secure element;
  check if the error detection/correction code of the pre-derived secure-ranging secret key is valid; and
  generate an interrupt for a digital key framework if a result of the check is that the error detection/correction code of the pre-derived secure-ranging secret key is invalid indicating that the pre-derived secure-ranging secret key is corrupt.

5. The responder device of claim 4, wherein the secure element is further operable to:
generate a new pre-derived secure-ranging secret key if the result of the check is that the error detection/correction code of the pre-derived secure-ranging secret key is invalid.

6. The responder device of claim 1, further comprising:
a digital key framework
wherein the processor circuitry is further operable to:
  receive from the initiator device an interrupt for the digital key framework when an error detection/correction code of a pre-derived secure-ranging secret key stored in a secure element of the initiator device is invalid indicating that this pre-derived secure-ranging secret key is corrupt.

7. The responder device of claim 1, wherein the processor circuitry is further operable to:
generate a timer query for the initiator device regarding a Time To Live (TTL) time associated with the active secure-ranging secret key as stored in the initiator device;
receive a timer query response including the TTL time; and
generate a timer correction to synchronize the TTL time of the initiator device and a TTL time associated with the active secure-ranging secret key as stored in the responder device.

8. The responder device of claim 7, wherein the processor circuitry is further operable to:
generate the timer correction if the TTL time of the initiator device and the TTL time of the responder device are out of synchronization.

9. The responder device of claim 7, wherein the processor circuitry is further operable to:
generate the timer correction for the initiator device to synchronize the TTL time of the initiator device to the TTL time of the responder device.

10. The responder device of claim 7, wherein the processor circuitry is further operable to:
generate the timer correction to synchronize the TTL time of the responder device to the TTL time of the initiator device.

11. The responder device of claim 1, wherein the responder device is comprised within a vehicle and the initiator device is comprised within a smartphone or key frequency operated button (key FOB).

12. The responder device of claim 1, wherein the generation of the first query and receipt of the first query response are performed within a predetermined period of time after the initiator device creates a secure wireless channel with the responder device.

13. The responder device of claim 1, wherein the generation of the first query and receipt of the first query response are performed periodically.

14. The responder device of claim 1, wherein the active secure-ranging secret key is an active ultrawide band (UWB) ranging secret key (URSK), and the wireless module is a UWB module.

15. A method, performed by a responder device operable to engage in short-range wireless communications with an initiator device, the method comprising:

generating a first query for the initiator device in a ranging area of the responder device to initiate a verification of whether an active secure-ranging secret key as stored within the initiator device complies with an active secure-ranging secret key as stored within the responder device; and receiving a first query response including an indication of whether the active secure-ranging secret key as stored within the initiator device complies with the active secure-ranging secret key as stored within the responder device.

16. The method of claim 15, further comprising:

verifying whether a wireless session identifier corresponding with the active secure-ranging secret key as stored within the initiator device complies with the active secure-ranging secret key as stored within the responder device.

17. The method of claim 15, further comprising:

generating a second query for the initiator device to request a list of one or more pre-derived secure-ranging secret key(s) stored within the initiator device; and receiving a second query response including the list of the one or more pre-derived secure-ranging secret key(s) stored within the initiator device, along with their corresponding wireless session identifier(s).

18. The method of claim 15, further comprising:

generating, by a secure element of the responder device, an error detection/correction code for a pre-derived secure-ranging secret key associated with a digital key and stored in the secure element;

checking, by the secure element, if the error detection/correction code of the pre-derived secure-ranging secret key is valid; and generating, by the secure element, an interrupt for a digital key framework if a result of the check is that the error detection/correction code of the pre-derived secure-ranging secret key is invalid indicating that the pre-derived secure-ranging secret key is corrupt.

19. The method of claim 15, further comprising:

generating a timer query for the initiator device regarding a Time To Live (TTL) time associated with the active secure-ranging secret key as stored in the initiator device;

receiving a timer query response including the TTL time; and generating a timer correction to synchronize the TTL time of the initiator device and a TTL time associated with the active secure-ranging secret key as stored in the responder device.

20. The method of claim 19, further comprising:

generating the timer correction if the TTL time of the initiator device and the TTL time of the responder device are out of synchronization.

\* \* \* \* \*